Patented July 10, 1934

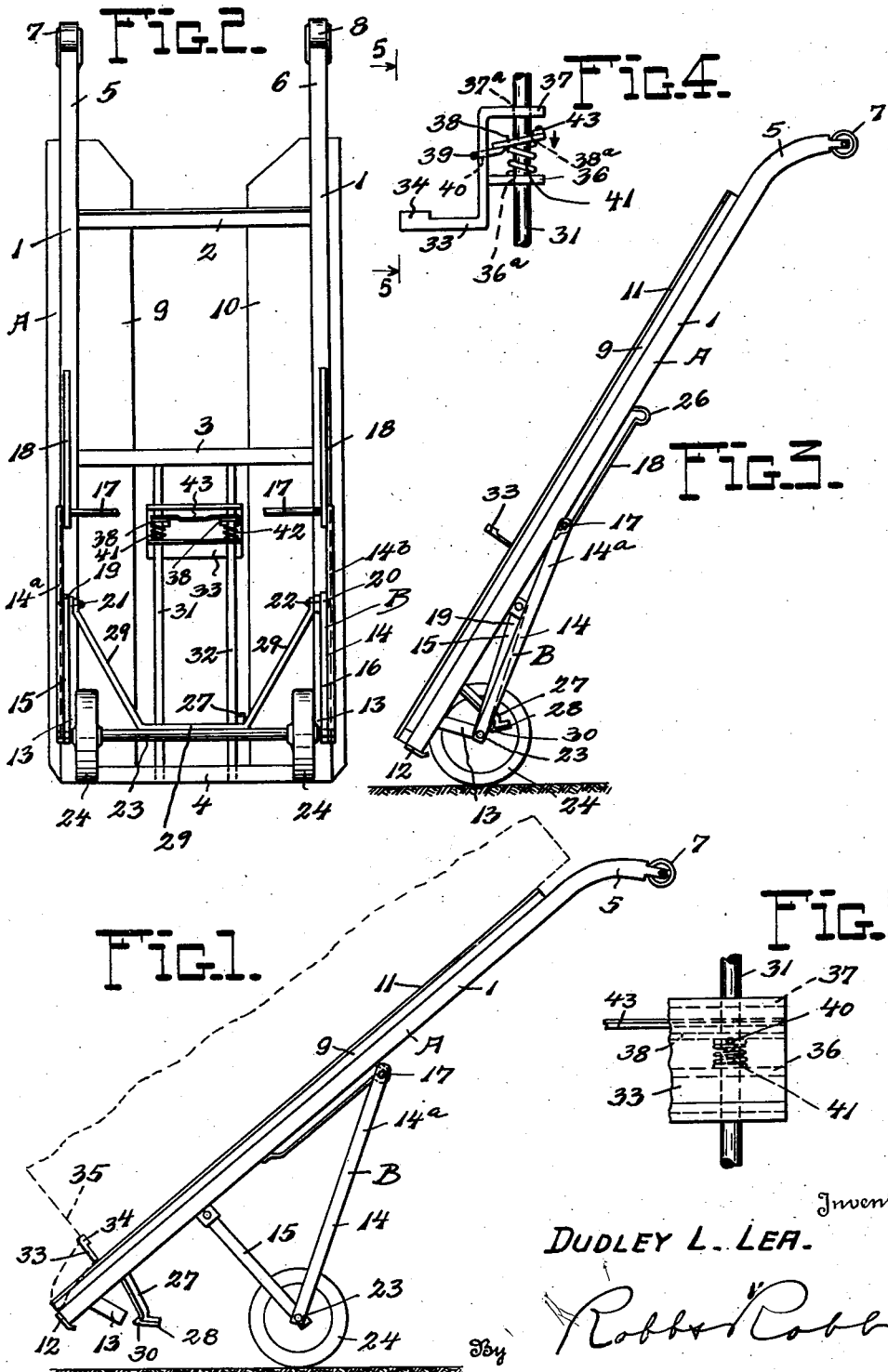

1,965,944

UNITED STATES PATENT OFFICE 1,965,944

TRUCK CONSTRUCTION

Dudley L. Lea, Findlay, Ohio

Application March 13, 1933, Serial No. 660,572

2 Claims. (Cl. 280—56)

Hand trucks of types employed for moving heavy bodies such as trunks, refrigerators, or other heavy objects, are very difficult to handle, especially in narrow passageways, around stair landings, or the like, and a great deal of effort is necessary, in handling such truck constructions, to keep the same balanced when the truck is to be moved in a considerably inclined position.

This application is a continuation as to all divisible subject matter of my copending application for Truck construction, filed November 14, 1932, Serial No. 642,676.

The hand truck of the present invention is especially designed to eliminate the disadvantages inherent in the usual hand truck constructions, and provides a foldable, collapsible frame structure movably secured to the frame of the truck and adapted to carry the supporting wheels or rollers of the same readily adjustable to different supporting positions with respect to the truck frame. It will therefore be seen that when the collapsible frame structure is adjusted to a position of maximum projection from the truck frame, the truck may be efficiently handled in a slightly inclined position with the center of gravity of the load carried thereon directly above the axis of the wheels. This adjustment of the collapsible frame structure and wheels of the hand truck is desirable where plenty of space for maneuvering of the truck is available.

When, however, the loaded truck has to be handled in a narrow space, such as at a stair landing or the like, the collapsible or foldable frame structure may be adjusted so as to bring the supporting wheels in a very close position toward the lower end of the truck frame to thereby permit a very considerable inclination of the truck while the center of gravity of the load may be retained vertically above the axis of the supporting wheels so that the truck may be readily balanced even though the same is in an almost vertical position.

More specifically, the present invention contemplates to a hand truck wherein the adjustment of the supporting wheels of the said truck by way of certain effective locking instrumentalities to retain the wheels or rollers in their respective positions adds to the efficiency, etc.

Other features and advantages of the invention will become apparent from the following description and accompanying drawing, in which:

Figure 1 illustrates a side elevation of a hand truck in an inclined position most adaptable for the transportation of objects in places where plenty of space for maneuvering said truck is available. The dotted lines of this figure indicate diagrammatically a refrigerator, for the transportation of which this truck is especially adapted.

Figure 2 shows a bottom view of a hand truck.

Figure 3 illustrates a side view of the truck, the wheel supporting frame structure being in a collapsed position with the supporting wheels in a position close to the lower end of the truck frame.

Figure 4 is a detail view of the retaining member mounted within the truck frame structure for retaining objects to be carried on the said truck.

Figure 5 is an elevational view of Figure 4, looking in the direction of the arrows 5—5.

Referring now to Figures 1, 2, and 3 of the drawing, 1 indicates side bars forming the truck frame, which are secured together in any convenient manner by transverse bars 2, 3, and 4. The upper portions of the side bars 1 are slightly bent as shown in Figures 1 and 3 to form the handle portions 5 and 6 which are adapted to carry rollers 7 and 8, the purpose of which will be later on defined. Mounted upon the frame structure of the truck which is generally indicated at A, are platform members 9 and 10 which are covered on the upper side with a heavy felt padding 11 adapted to eliminate any damage to objects carried upon said truck.

The lower end of the side bars 1 and of the transverse bar 4 is provided with a curved plate 12 to prevent damage to a floor or rug over which the said truck is manipulated. The side bars 1 are further provided with stop members 13 which are adapted to limit the motion of the collapsible frame structure 14. The said collapsible frame structure 14 consists of the arms 14a and 14b which are pivotally secured at one of their ends to a pair of arms 15 and 16, while the other end portions of the arms 14a and 14b are secured together by a transverse rod 17 adapted to slide within guide members 18. The end portions 19 and 20 of the arms 15 and 16 are pivotally secured to brackets 21 and 22 attached to the side bars 1 in any convenient manner.

The pivotal connection between the arms 14a and 15 and 14b and 16 is accomplished by an axle 23 which is also adapted to carry wheels or rollers 24 and 25. The guides 18 are formed at their upper ends into a retaining portion 26 which is adapted to hold the transverse rod 17 secured therein when the foldable frame structure, which is generally indicated at B, is at its maximum projecting position, as shown in Figure 1.

As previously mentioned herein, the stop members 13 are adapted to limit the motion of the collapsible frame structure B when the same is folded into a position as shown in Figure 3. The truck frame is further provided with a locking member 27 adapted to retain the frame structure B in its folded position as shown in Figure 3.

The locking member 27, which may be very conveniently made from a resilient material, is provided with a cam portion 28 which is adapted to engage with a reinforcing structure 29 when the frame structure B is moved into folded position. The locking member 27 is thereby lifted so as to permit the passage of the reinforcing structure 29 and axle 23 underneath the hook-like portion 30 of the locking member 27 which will then snap back into its original position and thereby lock the frame structure B in its folded position.

Between the transverse bars 3 and 4, and within the frame structure A of the truck there are arranged guide rods 31 and 32 which serve as carrier members for a retaining member 33 which is movably arranged on the said guide rods 31 and 32 and which may be adjusted and locked to the said guide rods in various positions. The retaining member 33 is provided with an upstanding portion 34 and is adapted to retain an object upon the platform of the truck by gripping it at its bottom portion 35, eliminating thereby any likelihood of damage to the edges of the outer visible surfaces of such object.

The retaining member 33 is of an S-like configuration as shown in Figure 4, and is provided with an extension 36 arranged parallel with respect to the upper flange 37 of the said member 33. The upper flange 37, and extension 36, which serves as additional bearing portions for the retaining member 33, are provided with apertures 37a and 36a through which the rods 31 and 32 are passed. It should be noted, of course, that the retaining member 33 is freely slidable on the said rods 31, 32, so that it may be shifted upwardly or downwardly on the said rods to various positions of adjustment.

Means are provided for locking the retaining member in various selected positions, and the said locking instrumentalities comprise locking plates 38 which are provided with apertures 38a within which the guide rods 31 and 32 pass. The locking plates 38 are further provided with extensions 39 which pass through holes 40 in the retaining member 33, and interposed between the locking plates 38 and the extension 36 and surrounding the guide rods 31 and 32, are helical springs 41 and 42 which are adapted to press against the locking plates 38 so as to move them into a slightly inclined position with respect to the retaining member 33 so that the edge of the apertures 38a of the locking plates will bite into the guide rods 31 and 32 to thereby interlock the retaining member 33 with the guide rods 32 and 31 to securely hold the retaining member in its selected position.

The locking plates 38 are interconnected by means of a bar 43 which may be welded or riveted to the said plates in any convenient manner. To release the locking instrumentalities above described, it is necessary only to press the bar 43 downwardly in the direction shown by the arrow in Figure 4, to thereby move the locking plates to a position parallel to the upper flange portion 37 of the retaining member 33. The edges around the apertures are thereby released from their interlocking engagement with the guide rods 31 and 32, and the retaining member 33 may now be moved into another position with respect to the frame of the truck. The downward pressure exerted upon the bar 43 as previously described, is now released, and springs 41 and 42 will move the locking plates 38 again into an inclined position with respect to the retaining member and guide rods 31 and 32, to thereby lock the said plates on the said rods in the manner previously described.

From the foregoing, it will be seen that when the hand truck has been loaded and the foldable frame structure B is in its maximum projecting position as shown in Figure 1, objects may very easily be moved around while gripping the truck at the handle portions 5 and 6, holding the same in an inclined position as shown in Figure 1, and the load may be easily balanced by retaining the center of gravity of the object and truck directly above the center of the axis of the wheels. When a truck is in this position, there is no possibility that the same may tip over when the wheels of the truck hit an obstruction as only a slight effort on the part of the operator under such conditions is necessary to keep the truck balanced. When the operator now approaches a small stair landing or other restricted place, it is only necessary that he exert a force by means of his foot against the arms 14a or 14b, thereby pushing the transverse rod 17 out of the retaining portion 26 of the guides so as to force the foldable frame structure against the forward end of the truck, in which position it will become automatically locked, as previously described. The truck may now be inclined to an almost vertical position while the center of gravity of the load may now be again properly balanced above the axis of the wheels without creating an undue tilting moment, as would be the case when a truck of the usual type is employed.

When the truck is in the position shown in Figure 3, the handle members may be lowered until the rollers 7 and 8 contact with the ground and the truck may then be pushed around in a manner similar to that of a four-wheel carriage. By placing the truck in this position, the same may be very efficiently used for moving heavy objects along an inclined surface, as for instance, a ramp, or the like.

The hand truck construction described herein is especially adapted for the handling of refrigerators of the domestic type, but it is understood that the truck may also be used for moving heavy objects of any kind for which its use is especially adapted.

Having thus described my invention, what I claim as new and desire to secure by Letters Patent of the United States, is—

1. A wheeled hand truck of the type having a wheeled support at one end and hand holds at the other end for one-man trucking purposes, which comprises, in combination, a truck frame having a load supporting surface, a pair of hand holds at one end, a wheeled support for the frame at the other end, said support including a member pivotally attached to the frame, a second member pivotally attached to the first member and slidably connected to the frame, a wheel supported by said members, said construction being of such a nature that when the hand truck is lifted at the hand hold end, access is afforded to the member slidably connected to the frame for foot shifting to move the first member and the wheel with respect to the frame, and a stop arranged adjacent the forward end of the truck frame for limiting movement of the wheel with respect to the frame in one direction, said stop acting in conjunction with the wheel supporting members as a brace for carrying at least a part of the dead load on the load supporting surface.

2. A wheeled hand truck of the type having wheeled support below a load supporting surface and a pair of hand holds for individual trucking purposes, which comprises, in combination, a frame having a load supporting surface and a pair of hand holds at one end for lifting the same, and a wheeled support which includes a pair of spaced members pivoted to the frame and axle, a pair of wheels mounted on said axle in spaced relation with a pair of brace members pivotally connected to the axle, means connecting the said brace members, a guideway for said means attached to the frame in which said means works, said construction being of such a nature that when the truck is lifted at the hand hold end, access is afforded to said means for foot manipulation thereof to move the second named member upwardly along the truck frame to cause the first named member to pivot about its axis and reposition the wheels with respect to the frame, means for limiting the movement of the wheels toward the frame, and means for locking the second named member in at least one position of adjustment.

DUDLEY L. LEA.